United States Patent

Astarabadi

[11] Patent Number: 5,825,855
[45] Date of Patent: Oct. 20, 1998

[54] METHOD OF RECOGNIZING PRE-RECORDED ANNOUNCEMENTS

[75] Inventor: Shaun Astarabadi, Irvine, Calif.

[73] Assignee: Toshiba America Information Systems, Inc., Irvine, Calif.

[21] Appl. No.: 790,200

[22] Filed: Jan. 30, 1997

[51] Int. Cl.$^6$ .................................................. H04M 1/64
[52] U.S. Cl. .................... 379/67; 379/88.02; 379/88.09; 379/88.23
[58] Field of Search .................. 379/67, 88, 89, 379/67.1, 88.01, 88.02, 88.08, 88.09, 88.22, 88.23; 382/30

[56] References Cited

U.S. PATENT DOCUMENTS

| | | | |
|---|---|---|---|
| 4,400,828 | 8/1983 | Pirz et al. | 382/30 |
| 4,757,525 | 7/1988 | Matthews et al. | 379/89 |
| 4,837,798 | 6/1989 | Cohen et al. | 379/88 |
| 4,903,305 | 2/1990 | Gillick et al. | 381/41 |
| 4,972,457 | 11/1990 | O'Sullivan | 379/59 |
| 4,996,707 | 2/1991 | O'Malley et al. | 379/100 |
| 5,003,575 | 3/1991 | Chamberlin et al. | 379/89 |
| 5,327,486 | 7/1994 | Wolff et al. | 379/96 |
| 5,335,276 | 8/1994 | Thompson et al. | 380/21 |
| 5,349,636 | 9/1994 | Irribarren | 379/89 |
| 5,444,768 | 8/1995 | Lemaire et al. | 379/68 |
| 5,452,289 | 9/1995 | Sharma et al. | 370/32.1 |
| 5,452,356 | 9/1995 | Albert | 380/9 |
| 5,608,784 | 3/1997 | Miller | 379/88 |

*Primary Examiner*—Fan S. Tsang
*Assistant Examiner*—Allan Hoosain
*Attorney, Agent, or Firm*—Steven C. Sereboff; Sereboff & Buyan, LLP

[57] ABSTRACT

A method of recognizing correspondence between a pre-recorded sample announcement and the identical pre-recorded reference announcement is shown. The reference pre-recorded sample announcement is characterized in terms of: (1) Start of speech (SP) where the transition from silence to voicing occurs, (2) average frame power (AFP) for each power frame length of a voicing segment of speech (3) silence gap length (SGL), the duration of non-voicing between two consecutive voicing segments and (4) end of speech (EOS). The sample pre-recorded announcement is also characterized in terms of SP, AFP, SGL, and EOS. The SP, AFPs, SGLs, and EOS of the reference pre-recorded announcement is compared with that of the sample pre-recorded announcement to determine if a match exists.

37 Claims, 8 Drawing Sheets

METHOD OF RECOGNIZING PRE-RECORDED ANNOUNCEMENTS

NOTICE OF COPYRIGHTS AND TRADE DRESS

A portion of the disclosure of this patent document contains material which is subject to copyright protection. This patent document may show and/or describe matter which is or may become trade dress of the owner. The copyright and trade dress owner has no objection to the facsimile reproduction by any one of the patent disclosure, as it appears in the Patent and Trademark Office patent files or records, but otherwise reserves all copyright and trade dress rights whatsoever.

BACKGROUND OF THE INVENTION

1. Field of the Invention

The present invention relates generally to a method of recognizing speech and, more generally, to a method for simple, real-time recognition of previously introduced recordings of pre-recorded spoken announcements.

2. Description of Related Art

Conventionally, a number of different methods have been used in electronic recognition of words and/or phrases.

One methodology involves word based matching—that is, matching performed in units of words. In this method, input speech is extracted in units of words, with word recognition being accomplished by word pattern matching for entire words.

Another methodology involves matching in units of word-constituent elements. Using this method, input speech is segmented into units of word constituent elements such as phonemes or syllables. The phonemes or syllables are then recognized by pattern matching and the word input speech is then matched with selections from a series of recognized word constituent elements.

Still another method involves the recognition of words using both pattern matching of entire words and a network of a series of labels attached to the respective frames of a speech pattern.

Yet another method uses extraction of speech parameters of input speech, and performs word recognition by word-based matching as well as by matching in units of word constituent elements. This method is claimed to allow real-time learning.

Word spotting applies speech recognition technology to enable the location of key words or phrases in the context of fluent speech. Two methodologies have been used to accomplish this. The first is Hidden Markov Models (HMMs). These consist of a set of states with associated outputs, where the output of a state is a feature vector describing a sound. Transition probabilities between states allow modeling a sequence of sounds. The second key word spotting methodology involves speaker-dependent word spotting systems based on template matching using dynamic time warping.

All the methodologies mentioned have a number of characteristics in common. All are heavy users of computer resources, specifically memory and computing power. The memory requirements are based on the storage of large numbers of patterns which need to be matched in order to distinguish between hundreds or thousands of possible audible inputs. The computational resources are needed to obtain matching of the actual input with the stored patterns, taking into account numerous factors. These include, theoretically, all the nuances of speech differences between two people speaking the same word. Even where a single speaker is the only source of the input, the speech of a given individual will vary from one time to another due to health, mental state and other factors. Even under similar circumstances volume, tempo, etc. may vary. These factors must all be accounted for in order to accommodate the large numbers of possibilities as to words, phrases, and speakers which must be handled by many speech recognition systems.

In order to handle this lengthy list of variables, the pattern matching techniques used in the prior art generally operate entirely in the frequency domain. None of the prior art techniques operate purely in the time domain.

In addition, many of these methods are language dependent, as each language uses only a subset of all the different sounds possible.

There are, however, situations where the number of possible inputs is severely curtailed. In particular, the needs of a system wherein a user can teach a portable computer to recognize one of a limited number of possible announcements so that it can respond appropriately are relatively simple. Generally, these announcements will contain key words or phrases which further simplify recognition.

One such application is where the speech is output by a voice mail system or the like, as described in my co-pending U.S. patent application Ser. No. 08/710,366, incorporated herein by reference. In this system, training is carried out by introducing to the computer a series of pre-recorded reference announcements. Later, recognition is performed by evaluation of a sample announcement input against these reference announcements. Since the sample announcement is identical to one of the reference announcements, a nearly exact match is expected (subject only to variations in line quality and other instrument rather than human-sourced variations). Thus, given a greatly truncated choice of reference matches and a highly limited degree of variability between a reference and its match, the complex methodologies of word or phrase recognition represent an excess and unnecessary use of computer resources.

This invention is addressed to greatly simplifying the process of recognizing speech (generally by key words or phrases) in situations where the identical reference recording that is used to train the recognition engine is also used to provide the sample input for recognition.

It is therefore a first object of the invention to provide a simple method of recognizing speech in a sample pre-recorded announcement by matching information about both vocalization and the duration of silence with the identical pre-recorded reference announcement that was used to train the recognition engine.

It is a further object of the invention to provide a simple method of recognizing key words and phrases in a sample pre-recorded announcement by matching information about both vocalization and the duration of silence with the identical pre-recorded reference announcement that was used to train the recognition engine.

It is another object of the invention to provide a simple method of recognizing speech in a sample pre-recorded announcement by matching information about both vocalization and silent periods in key words with key words in the identical pre-recorded reference announcement that was used to train the recognition engine.

These objects and others are provided by the method of the present invention.

SUMMARY OF THE INVENTION

In accordance with the present invention, there is provided a method for recognizing correspondence between a pre-recorded sample announcement and the identical pre-recorded reference announcement. The reference pre-recorded sample announcement is characterized in terms of: (1) Start of speech (SP) where the transition from silence to voicing occurs, (2) average frame power (AFP) for each power frame length of a voicing segment of speech (3) silence gap length (SGL), the duration of non-voicing between two consecutive voicing segments and (4) end of speech (EOS). The sample pre-recorded announcement is also characterized in terms of SP, AFP, SGL, and EOS. The SP, AFPs, SGLs, and EOS of the reference pre-recorded announcement is compared with that of the sample pre-recorded announcement to determine if a match exists.

A method for recognizing a pre-recorded announcement is performed by accepting as input for training a signal representing a reference pre-recorded announcement, determining characteristics of a starting point (SP) for a transition from silence to speech in the reference pre-recorded announcement, determining characteristics of a first voicing segment of the reference pre-recorded announcement, determining a silence gap length (SGL) for a period of silence following the first voicing segment of the reference pre-recorded announcement, determining characteristics of a second voicing segment of the reference pre-recorded announcement, characterizing an end of speech (EOS) of the reference pre-recorded announcement. The method involves storing the characteristics of the SP for the transition from silence to speech in the reference pre-recorded announcement, storing the characteristics of the first voicing segment of the reference pre-recorded announcement, storing the SGL for the period of silence following the first voicing segment of the reference pre-recorded announcement, storing the characteristics of the second voicing segment of the reference pre-recorded announcement, and storing the characteristics of the EOS of the reference pre-recorded announcement. Thereafter the process continues by accepting as input for recognition a signal representing a sample pre-recorded announcement, recognizing the SP for the transition from silence to speech in the sample pre-recorded announcement, determining characteristics of a first voicing segment of the reference pre-recorded announcement, and comparing the characteristics of the first voicing segment of the sample pre-recorded announcement with the stored characteristics of the first voicing segment of the reference pre-recorded announcement. If the characteristics of the first voicing segment of the sample pre-recorded announcement match the stored characteristics of the first voicing segment of the reference pre-recorded announcement, then the characteristics of the SGL for the period of silence following the first voicing segment of the sample pre-recorded announcement are compared with the stored characteristics of the SGL for the period of silence following first voicing segment of the reference pre-recorded announcement. If the characteristics of the SGL for the period of silence following the first voicing segment of the sample pre-recorded announcement match the stored characteristics of the SGL for the period of silence following first voicing segment of the reference pre-recorded announcement, then the characteristics of the second voicing segment of the sample pre-recorded announcement are compared with the stored characteristics of the second voicing segment of the reference pre-recorded announcement. If the characteristics of the second voicing segment of the sample pre-recorded announcement match the stored characteristics of the second voicing segment of the reference pre-recorded announcement, then the EOS of the sample announcement is recognized. The system will recognize a match between the sample pre-recorded announcement and the reference pre-recorded announcement.

According to an aspect of the invention there is the additional step of determining a level of confidence when there is an incomplete match between the reference pre-recorded announcement and the sample pre-recorded announcement.

According to another aspect of the invention there are additional steps of normalizing the signal representing the reference pre-recorded announcement and normalizing the signal representing the sample pre-recorded announcement.

According to yet another aspect of the invention the step of recognizing a match between the sample pre-recorded announcement and the reference pre-recorded announcement is further broken down. The sub-steps are: recognizing transitions between voicing segments and silence and between silence and voicing segments, at each transition evaluating a calculated signal derived from the sample pre-recorded announcement with an expected, stored signal derived from the reference pre-recorded announcement, advancing a state machine if a match between the calculated signal derived from the sample pre-recorded announcement with an expected, stored signal derived from the reference pre-recorded announcement is obtained, and resetting the state machine if a match between the calculated signal derived from the sample pre-recorded announcement with an expected, stored signal derived from the reference pre-recorded announcement is not obtained.

According to still another aspect of the invention there is another step of determining that there is a match between the sample pre-recorded announcement and the reference pre-recorded announcement when the EOS of the sample announcement matches the EOS of the reference announcement.

In a further aspect of the invention, characteristics for a number of different pre-recorded reference announcements are all obtained and stored in memory and state machines for each of the pre-recorded reference announcements are all launched upon initiation of the acceptance of input from a pre-recorded sample announcement.

In an aspect of the invention, the step of recognizing a match between the sample pre-recorded announcement and the reference pre-recorded announcement is accomplished by cross correlation.

According to an aspect of the invention there are added steps of determining in at least one test case if proper recognition of the sample announcement is made and, if proper recognition of the sample announcement is not made, then extracting further details of the voicing segments to uniquely identify the sample announcement.

According to another aspect of the invention, extracting further details of the voicing segments consists of subdividing each voicing segment into equal length frames.

According to yet another aspect of the invention, extracting further details of the voicing segments consists of subdividing each voicing segment into fixed length frames.

Another aspect of the invention is a method for recognizing a phrase generated within a pre-recorded announcement, performed by accepting as input a reference phrase forming a portion of a pre-recorded announcement, determining a point where speech representing a beginning of the reference phrase occurs, calculating the mean energy between two points for voicing portions of speech in the reference phrase, and calculating a silence gap length within the reference phrase. The method includes determining an end of the reference phrase, storing as parameters for the reference phrase the point where speech representing a beginning of the reference phrase occurs, the mean energy between two points for voicing portions of speech, the silence gap length, and the end of the reference phrase. This is followed by accepting as input a sample phrase forming a portion of a pre-recorded announcement, determining a point where speech representing a beginning of the sample phrase occurs, calculating mean energy between two points for voicing portions of speech in the sample phrase, calculating a silence gap length within the sample phrase, determining an end of the sample phrase. The method includes comparing the stored parameter values for the reference phrase with the point where speech representing a beginning of the sample phrase occurs, the mean energy between two points for voicing portions of speech for the sample phrase, the silence gap length in the sample phrase, and the end of the sample phrase.

According to still another aspect of the invention there is the additional step of determining a level of confidence when there is an incomplete match between the phrase in the sample pre-recorded announcement and the phrase in the reference pre-recorded announcement.

In a further aspect of the invention there exist additional steps of normalizing the signal representing the reference pre-recorded announcement, and normalizing the signal representing the sample pre-recorded announcement. Preferably there are steps of determining in at least one test case if proper recognition of the sample phrase is made, and if proper recognition of the sample phrase is not made then extracting further details of the voicing segments to uniquely identify the sample phrase.

According to an aspect of the invention extracting further details of the voicing segments consists of subdividing each voicing segment into equal length frames.

According to another aspect of the invention extracting further details of the voicing segments consists of subdividing each voicing segment into fixed length frames.

A still further aspect of the invention provides a method for responding in an appropriate pre-determined fashion to a pre-recorded announcement. It is performed by accepting as input a pre-recorded reference announcement, viewing the reference announcement in a time domain, and obtaining characteristics of voicing segments of the reference announcement within the time domain. The method involves storing in memory the characteristics of voicing segments of the reference announcement obtained within the time domain and, thereafter, obtaining characteristics of silence segments of the reference announcement within the time domain, storing in memory the characteristics of silence segments of the reference announcement obtained within the time domain, accepting as input a pre-recorded sample announcement, viewing the sample announcement in a time domain, obtaining characteristics of voicing segments of the sample announcement within the time domain, comparing the characteristics of the voicing segments of the sample announcement within the time domain with the characteristics of voicing segments of the reference announcement within the time domain, and obtaining characteristics of silence segments of the sample announcement within the time domain. The process then continues by comparing the characteristics of the silence segments of the sample announcement within the time domain with the characteristics of silence segments of the reference announcement within the time domain, determining from the comparisons if the sample announcement is a match with the reference announcement, and if the sample pre-recorded announcement matches the reference pre-recorded announcement then responding in a pre-determined fashion.

According to yet another aspect of the invention, the step of recognizing a match between the sample pre-recorded announcement and the reference pre-recorded announcement is performed by recognizing transitions between voicing segments and silence and between silence and voicing segments, at each transition evaluating a calculated signal derived from the sample pre-recorded announcement with an expected, stored signal derived from the reference pre-recorded announcement, advancing a state machine if a match between the calculated signal derived from the sample pre-recorded announcement with an expected, stored signal derived from the reference pre-recorded announcement is obtained, and resetting the state machine if a match between the calculated signal derived from the sample pre-recorded announcement with an expected, stored signal derived from the reference pre-recorded announcement is not obtained.

According to still another aspect of the invention there is the added step of determining that there is a match between the sample pre-recorded announcement and the reference pre-recorded announcement when the EOS of the sample announcement matches the EOS of the reference announcement.

In a further aspect of the invention, characteristics for a number of different pre-recorded reference announcements are all obtained and stored in memory. State machines for each of the pre-recorded reference announcements are all launched upon initiation of the acceptance of input from a pre-recorded sample announcement.

Alternatively, the step of recognizing a match between the sample pre-recorded announcement and the reference pre-recorded announcement is accomplished by cross correlation.

According to an aspect of the invention there is the additional step of determining a level of confidence when there is no exact match between the sample pre-recorded announcement and the reference pre-recorded announcement.

According to another aspect of the invention there are additional steps of normalizing the signal representing the reference pre-recorded announcement and normalizing the signal representing the sample pre-recorded announcement.

According to yet another aspect of the invention additional steps involve determining that excess detail is used to discriminate between different pre-recorded announcements and adjusting calculated parameters so as to decrease usage of storage and calculation resources.

According to still another aspect of the invention various characteristics are stored as parameters and usage of storage and calculation resources is decreased by normalizing the parameters.

In a further aspect of the invention usage of storage and calculation resources is decreased by increasing the number of samples in an average power value for a voicing segment of speech calculated for each power frame length segment of the signal (AFP) so that fewer AFPs are calculated and stored.

Another aspect of the inventions provides a method for comparing a sample pre-recorded verbal announcement with a reference pre-recorded verbal announcement. It is performed by (1) determining a key phrase within a reference pre-recorded verbal announcement, (2) accepting as input for training a signal representing the key phrase within the reference pre-recorded announcement, (3) determining characteristics of a starting point (SP) for a transition from silence to speech representing initiation of the key phrase in the reference pre-recorded announcement, (4) determining characteristics of a first voicing segment of the key phrase of the reference pre-recorded announcement, and (5) determining a first silence gap length (SGL) for a period of silence following the first voicing segment of the key phrase of the reference pre-recorded announcement. Furthermore, the method includes (6) determining characteristics of a next voicing segment of the key phrase of the reference pre-recorded announcement, (7) repeating steps 5 and 6 until an end of the key phrase is noted, (8) characterizing an end of speech (EOS) of the key phrase of the reference pre-recorded announcement, (9) storing the characteristics of the SP for the transition from silence to speech in the key phrase of the reference pre-recorded announcement, (10) storing the characteristics of the first voicing segment of the key phrase of the reference pre-recorded announcement, (11) storing the SGL for the period of silence following the first voicing segment of the key phrase of the reference pre-recorded announcement, (12) storing the characteristics of all succeeding voicing segments and SGLs of the key phrase of the reference pre-recorded announcement, and (13) storing the characteristics of the EOS of the key phrase of the reference pre-recorded announcement. The method continues by (14) accepting as input for recognition a signal representing a sample pre-recorded announcement, (15) recognizing the SP for the transition from silence to speech in the sample pre-recorded announcement, (16) determining characteristics of a first voicing segment of the sample pre-recorded announcement, and (17) comparing the characteristics of the first voicing segment of the sample pre-recorded announcement with the stored characteristics of the first voicing segment of the key phrase of the reference pre-recorded announcement. Next, (18) if the characteristics of the first voicing segment of the sample pre-recorded announcement do not match the stored characteristics of the first voicing segment of the key phrase of the reference pre-recorded announcement, then, (a) repeating steps 15 through 18 designating successive voicing segments as the first voicing segment of the sample pre-recorded announcement until the characteristics of the first voicing segment of the sample pre-recorded announcement matches the stored characteristics of the first voicing segment of the key phrase of the reference pre-recorded announcement indicating that the key phrase of the sample pre-recorded announcement has been reached, and (19) comparing the characteristics of the SGL for the period of silence following the first voicing segment of the key phrase of the sample pre-recorded announcement with the stored characteristics of the SGL for the period of silence following first voicing segment of the key phrase of the reference pre-recorded announcement, if the characteristics of the SGL for the period of silence following the first voicing segment of the sample pre-recorded announcement match the stored characteristics of the SGL for the period of silence following first voicing segment of the reference pre-recorded announcement. Then, (20) for all successive voicing segments and SGLs of the key phrase of the sample pre-recorded announcement, comparing the characteristics of each voicing segment and SGL with respective stored characteristics of voicing segments and SGLs of the key phrase of the reference pre-recorded announcement and if characteristics of each voicing segment and SGL matches the respective stored characteristics of voicing segments and SGLs of the key phrase of the reference pre-recorded announcement, then (21) recognizing the EOS of the key phrase of the sample announcement, and (22) recognizing a match between the sample pre-recorded announcement and the reference pre-recorded announcement. In one aspect of the invention, steps 1 through 8 are performed at least twice, each time using a different voicing threshold point.

According to another aspect of the invention, there is shown a computer device for responding in an appropriate pre-determined fashion to a pre-recorded announcement. The computer device has a processor, a memory coupled to the processor for storing a program and data therein, a data input device coupled to the processor, an audio input subsystem coupled to the processor for accepting input speech signals, and a stored program resident in the memory. The program performs the steps of accepting as input a pre-recorded reference announcement, viewing the reference announcement in a time domain, obtaining characteristics of voicing segments of the reference announcement within the time domain, storing in memory the characteristics of voicing segments of the reference announcement obtained within the time domain, obtaining characteristics of silence segments of the reference announcement within the time domain, and storing in memory the characteristics of silence segments of the reference announcement obtained within the time domain. It also performs the steps of accepting as input a pre-recorded sample announcement, viewing the sample announcement in a time domain, obtaining characteristics of voicing segments of the sample announcement within the time domain, comparing the characteristics of the voicing segments of the sample announcement within the time domain with the characteristics of voicing segments of the reference announcement within the time domain, obtaining characteristics of silence segments of the sample announcement within the time domain, comparing the characteristics of the silence segments of the sample announcement within the time domain with the characteristics of silence segments of the reference announcement within the time domain, determining from the comparisons if the sample announcement is a match with the reference announcement, and if the sample pre-recorded announcement matches the reference pre-recorded announcement then responding in a pre-determined fashion.

Another aspect of the invention presents a computer device for recognizing a phrase generated within a pre-recorded announcement. The computer device has a processor, a memory coupled to the processor for storing a program and data therein, a data input device coupled to the processor, an audio input subsystem coupled to the processor for accepting input speech signals, and a stored program resident in the memory. The program performs the steps of accepting as input a reference phrase forming a portion of a pre-recorded announcement, determining a point where speech representing a beginning of the reference phrase occurs, calculating mean energy between two points for voicing portions of speech in the reference phrase, calculating a silence gap length within the reference phrase, determining an end of the reference phrase, storing as parameters for the reference phrase the point where speech representing a beginning of the reference phrase occurs, the mean energy between two points for voicing portions of speech, the silence gap length, and the end of the reference phrase. It also performs the steps of accepting as input a sample phrase forming a portion of a pre-recorded announcement, determining a point where speech representing a beginning of the sample phrase occurs, calculating mean energy between two points for voicing portions of speech in the sample phrase, calculating a silence gap length within the sample phrase, determining an end of the sample phrase, and comparing the stored parameter values for the reference phrase with the point where speech representing a beginning of the sample phrase occurs, the mean energy between two points for voicing portions of speech for the sample phrase, the silence gap length in the sample phrase, and the end of the sample phrase.

According to an aspect of the invention the stored program determines a level of confidence when there is not an exact match between the phrase in the sample pre-recorded.

The invention provides a program storage device readable by a machine, tangibly embodying a program of instructions executable by the machine to perform method steps for responding in an appropriate pre-determined fashion to a pre-recorded announcement. The steps include accepting as input a pre-recorded reference announcement, viewing the reference announcement in a time domain, obtaining characteristics of voicing segments of the reference announcement within the time domain, storing in memory the characteristics of voicing segments of the reference announcement obtained within the time domain, obtaining characteristics of silence segments of the reference announcement within the time domain, and storing in memory the characteristics of silence segments of the reference announcement obtained within the time domain. It also includes accepting as input a pre-recorded sample announcement, viewing the sample announcement in a time domain, obtaining characteristics of voicing segments of the sample announcement within the time domain, comparing the characteristics of the voicing segments of the sample announcement within the time domain with the characteristics of voicing segments of the reference announcement within the time domain, obtaining characteristics of silence segments of the sample announcement within the time domain, comparing the characteristics of the silence segments of the sample announcement within the time domain with the characteristics of silence segments of the reference announcement within the time domain, determining from the comparisons if the sample announcement is a match with the reference announcement, and if the sample pre-recorded announcement matches the reference pre-recorded announcement then responding in a pre-determined fashion.

A computer program product has a computer usable medium having computer readable program code embodied therein for causing a computer to recognize a phrase generated within a pre-recorded announcement. The recognition is performed by steps including accepting as input a reference phrase forming a portion of a pre-recorded announcement, determining a point where speech representing a beginning of the reference phrase occurs, calculating mean energy between two points for voicing portions of speech in the reference phrase, calculating a silence gap length within the reference phrase, determining an end of the reference phrase, storing as parameters for the reference phrase the point where speech representing a beginning of the reference phrase occurs, the mean energy between two points for voicing portions of speech, the silence gap length, and the end of the reference phrase. It includes accepting as input a sample phrase forming a portion of a pre-recorded announcement, determining a point where speech representing a beginning of the sample phrase occurs, calculating mean energy between two points for voicing portions of speech in the sample phrase, calculating a silence gap length within the sample phrase, determining an end of the sample phrase, and comparing the stored parameter values for the reference phrase with the point where speech representing a beginning of the sample phrase occurs, the mean energy between two voicing portions of speech for the sample phrase, the silence gap length in for training a computer to recognize a reference pre-recorded announcement.

According to another aspect of the invention training of a computer to recognize a reference pre-recorded announcement is performed by accepting as input a reference phrase forming a portion of a pre-recorded announcement, determining a point where speech representing a beginning of the reference phrase occurs, calculating mean energy between two points for voicing portions of speech in the reference phrase, calculating a silence gap length within the reference phrase, determining an end of the reference phrase, and storing as parameters for the reference phrase the point where speech representing a beginning of the reference phrase occurs, the mean energy between two points for voicing portions of speech, the silence gap length, and the end of the reference phrase.

According to yet another aspect of the invention there is provided a method for comparing a sample pre-recorded announcement with a previously analyzed reference pre-recorded announcement wherein parameters representing a key phrase of the reference pre-recorded announcement have been stored. It is performed by accepting as input a sample phrase forming a portion of the sample pre-recorded announcement, determining a point where speech representing a beginning of the sample phrase occurs, calculating mean energy between two points for voicing portions of speech in the sample phrase, calculating a silence gap length within the sample phrase, determining an end of the sample phrase, and comparing the stored parameter values for the reference phrase with the point where speech representing a beginning of the sample phrase occurs, the mean energy between two points for voicing portions of speech for the sample phrase, the silence gap length in the sample phrase, and the end of the sample phrase.

DESCRIPTION OF THE DRAWINGS

These and other advantages of the present invention are best understood with reference to the drawings, in which, in varying detail.

These and additional embodiments of the invention may now be better understood by turning to the following detailed description wherein an illustrated embodiment is described.

DETAILED DESCRIPTION OF THE INVENTION

Throughout this description, the preferred embodiment and examples shown should be considered as exemplars, rather than limitations on the apparatus and methods of the present invention.

Figure 1:
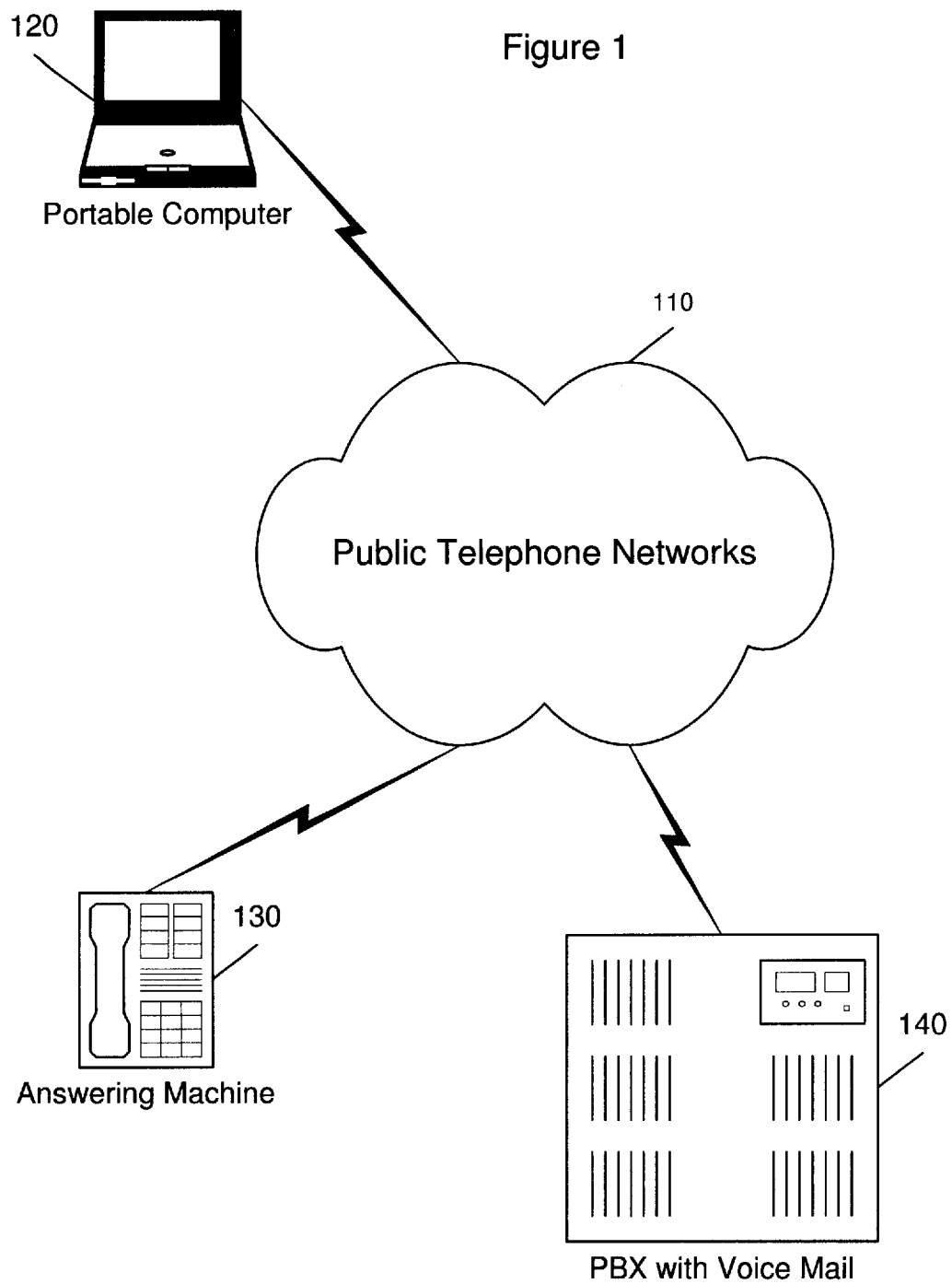
FIG. 1 is a block diagram of devices for use in conjunction with the system and method of the invention.

Referring now to FIG. 1, there is shown a block diagram of devices preferably used in conjunction with the system and method of the invention. These devices include a portable computer 120, an answering machine 130 and a PBX with voice mail 140. The preferred personal computer is a notebook PC running Windows95 (Microsoft Corporation, Redmond, Wash.).

The portable computer 120 may be any one from a class of devices which are portable and relatively light and have a processor, a data input device, a display and memory for data and program storage. Such a device may be a notebook PC, a palmtop PC, a personal digital assistant or single purpose computer. The processor is exemplified by a CISC or RISC microprocessor such as the Intel Corporation (Santa Clara, Calif.) Pentium and Digital Equipment Corporation (Maynard, Mass.) Alpha. The data input device is exemplified by a keyboard, mouse, trackball or pen. The display is exemplified by an LCD or CRT. The memory is exemplified by a hard drive, SIMMs, DIMMS, an optical drive or a floppy drive. The memory is coupled to the processor for storing programs, announcements, scripts, messages, etc. The portable computer 120 also preferably includes a modem with voice capability, or other means of interfacing selectively and temporarily with the telephone network 110 as well as recording a voice from a telephonic connection.

The portable computer 120 also preferably includes a sound board such as SoundBlaster sound board from Creative Labs, or an equivalent which has an audio input subsystem for processing audio inputs and an audio output subsystem for processing audio outputs. The audio input subsystem preferably includes an analog-to-digital converter which converts the analog audio signals accepted by the device to digital signals for ease of storage. The audio output subsystem preferably includes a digital-to-analog converter which converts stored digital signals into analog audio signals for playback over earphones or a speaker 128.

The portable computer 120 also preferably includes one or more programs, stored in its memory, for controlling the interaction of the components of the portable computer 120 and how the portable computer interacts with the user, the telephone network 110, the answering machine 130 and the PBX 140.

The answering machine 130 may be any one from a class of well know devices which are relatively inexpensive and are used in homes and small businesses for recording telephone messages. Typical answering machines can answer one or two lines, although larger capacity answering machines are known. Typical answering machines have a single out going message (OGM), and can store a number of in coming messages (ICMs). However, some answering machines provide a number of 'mail boxes.'

The PBX 140 may be any of a class of well known devices which are relatively expensive and are used in large organizations for recording telephone messages.

In accordance with the invention, the portable computer 120 is used to access a voice mail systems such as the answering machine 130 and/or the PBX 140 and retrieve messages stored by them. The portable computer 120 accesses these devices 130, 140 through a telephone network 110 which is preferably the public telephone network, setting up a stable, but temporary telephone interface and accepting and interpreting the OGMs. The invention is useful also for retrieving messages from devices 130, 140 on a private telephone network.

A user wishing to train a speech recognition program in accordance with this invention will first play a number of recordings, each of which contains a different 'reference' announcement that the user expects the system to recognize. The speech patterns of these reference recordings are used for training the system to recognize future inputs of 'sample' recording. It is intended that a sample recording will always be identical to a previously learned reference recording.

While there may be times when it is necessary to compare two announcements in their entirety in order to differentiate between them, this is not normally the case. Normally each announcement contains key words or key phrases which differentiate it uniquely form all the other announcements in the set.

During the learning process, the program extracts data from the reference recording in accordance with the method of this invention and stores the extracted data. Later, when a sample recording is played, its data is similarly extracted. By matching the extracted data of the sample recording to that of one or more reference recordings, the nature of the sample recording is recognized and the program responds appropriately. This reaction may be in the nature of activities limited to the program or it may involve interaction with and/or control of various peripheral or remote devices, the user, or others.

Recognition may be based on matching of the entire set of data taken from a full length reference recording. On the other hand, rather than playing the entire pre-recorded announcements during training, the system may be trained to recognize only the key words or phrases. This minimizes the amount of memory needed to store the relevant data.

For the purposes of the following examples, it may be assumed that the recognition may be based on either matching of entire announcements or on matching of key words and phrases alone. Where the methodology differs, depending on which type of matching is used, the differences are noted. It may also be assumed that the system described herein is used for recognition of announcements from a typical voice mail system. Such a system will provide only a small number of possible announcement, allowing key word or phrase recognition to be used.

Figure 2:
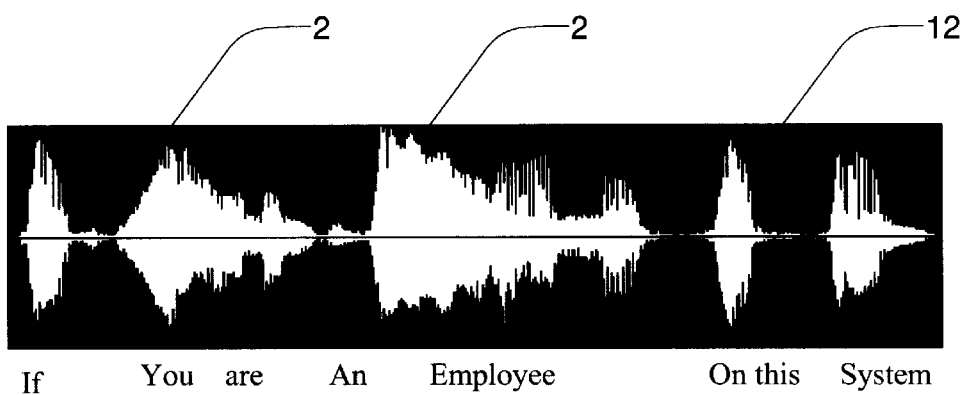
FIG. 2 is a waveform normalization of a 1.85 second utterance.

Referring now to FIG. 2, there is shown the waveform normalization of a typical pre-recorded announcement that might be found in a voice mail system. The phrase used for this example, "If you are an employee on this system," comprises a 1.85 second utterance. This phrase typically may be used in a pre-recorded announcement played as a prompt for remote mail access of the voice mail system. It can be seen by examining FIG. 2 that, generally, when viewed in the time domain as compared with the frequency domain, human speech appears as clusters of intense signal activity 2. Each cluster is representative of a word or phrase (although humans do produce non-verbal vocalizations this would not be anticipated in pre-recorded announcements). Interspersed between the clusters of intense signal activity 2 are gaps of no or relatively little signal activity 12, representative of pauses between words or phrases. Within a given word or phrase, the signal activity appears generally to be periodic for voicing in vowels while it is lower in amplitude for consonants.

The periods of sound (voicing) and silence vary in length depending on the speaker and the surrounding (coarticulation) formants.

Because the invention is constrained to recognition of the playing of pre-recorded announcements on which it has already been trained, the time intervals for clusters of both sound and silence in any given reference announcement are identical to those of the sample announcement that needs to be identified as a match to it. There may be minor variations, however, due to transmission and processing delays and minor frequency shifts.

Using a constant threshold, the short-time energy of the signal (shown in FIG. 3) is used to detect the start and end points of silence gaps as described in L. R. Rabiner and R. W. Schafer, *Digital Processing of Speech Signals*, Prentice Hall (1978) pp. 119, 123, which is incorporated herein by reference. A good threshold for recognizing transitions between voicing and silence and vice versa is at about 35–40 dB. Simplifying the short-time energy formula by eliminating the square operation allows the threshold detection operation to be implemented as linear filtering of the discrete-time input signal with a rectangular window of one. This is shown in the equation:

$$E_n = \sum_{m=n-N+1}^{n} |\text{Frame}_m|$$

The short-time energy at sample n is simply the sum of the magnitudes of N samples: (n-N+1).

For the voicing portion, a mean energy value is calculated between the start and end points of the voicing. Where differences in overall amplitude between the reference recording used for training and subsequent play-backs of the sample recording exist, these differences are compensated for by normalizing the signal from the reference recording. This normalization suffices to permit recognition of the sample since the relative energy content from one cluster to the next remains constant where the identical recording is used.

Figure 4:
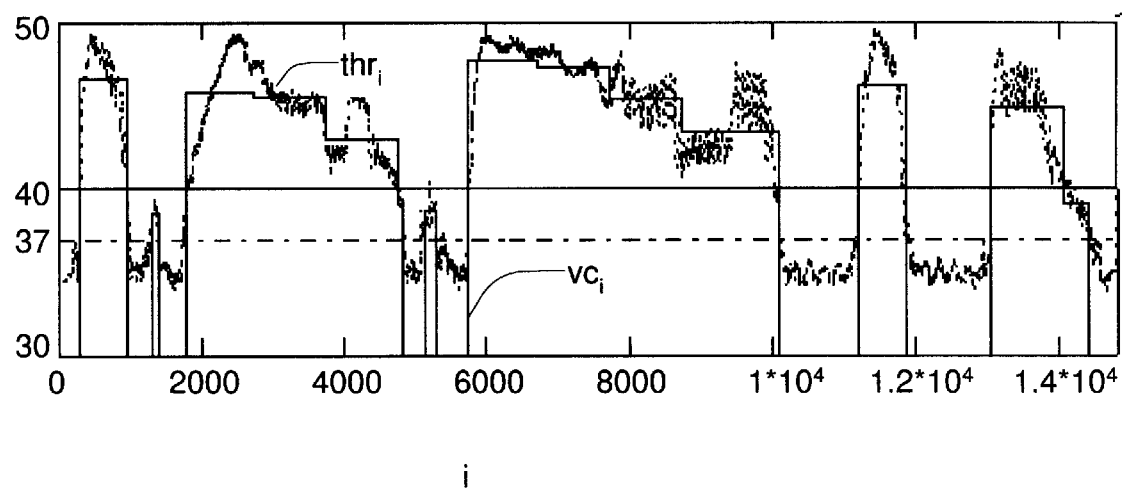
FIG. 4 is a rectangulated wave of the utterance of FIG. 2.

Thus is produced a positive rectangular wave with varying amplitudes and lengths of time, as shown in FIG. 4.

From this simplified representation of the pattern of speech of a reference announcement, a single set of calculations is conducted. These calculations, performed preferably during the training session, yield a set of parameters which are stored in memory. In practice, the memory requirements for storing the parameters associated with each key word or key phrase is very low. Thus, for example, a one second long key word is represented by approximately 20 parameters.

In the simplest situation, there is a very limited set of possible reference announcements, all of which sound radically different from one another. In such cases, comparison of four types of events and data associated with those events, suffices for recognition of a sample announcement. The symbols for these four events are SP, AFP, SGL and EOS.

Start of speech (SP): The point where the transition from silence to voicing occurs. Determination of the SP is made by recognizing when the "voicing threshold" (a constant) has been exceeded. Leading silence is preferably ignored, as is the case with trailing silence. Where key word or key phrase recognition is involved the period of leading silence may be relatively brief, following upon the articulation of speech that is not part of the key word or phrase.

Average frame power (AFP): The average power value for a voicing segment of speech is calculated for each "power frame length" segment of the signal. Each voicing segment of speech may be broken down into a number of power frame lengths, which are time divided segments of sound. These segments may be of equal or unequal lengths. The number of AFP values obtained for a given voicing segment depends on the duration of the voicing segment. Preferably, there are a number of AFP values obtained for each voicing segment.

The number of power frame lengths used depends upon the difficulty in discriminating between the various announcements (or the key words or key phrases of those announcements) for which the system is trained. The more difficult the discrimination, the greater the number of power frame lengths that will be necessary to achieve error free recognition.

Silence gap length (SGL): A single value representing the measurement of the duration of non-voicing between two consecutive voicing segments. The beginning and end of the silence gap is determined by the crossing of the voicing threshold value.

End of speech (EOS): For each recorded reference announcement that is analyzed in a training session, the EOS is defined to be the number of samples from the SP point to the termination of the key phrase. Normally, this point corresponds to the last transition from voicing to silence (based on the last crossing of the voicing threshold) in the key phrase. If the key phrase ends in the middle of a voicing segment, then that point is used to determine the ending. If an entire announcement is being used rather than the key phase then this point will correspond to the last transition from voicing to silence (based on the last crossing of the voicing threshold).

It is apparent that the SP and the EOS merely serve as indicators of the start and termination points for the sets of parameters being compared.

Typical constant values used to acquire the value of these parameters during a training session are given in Table I.

TABLE I

| Constant | Value |
|---|---|
| Voicing Threshold | 38 dB |
| Power Frame Length | 1000 samples (at 8 kHz = 130 ms) |

For each announcement that is used in training the recognition system, the vocalization against which a match will eventually be sought (key word, key phrase, or announcement) is stored in memory as a string of parameters which are derived from the actual signal obtained during the training session. Normally, a single playing of the announcement during the training session suffices to determine the values of these parameters. However, if the signal gain is not expected to be constant during the recognition phase, a range of threshold values are utilized in the training session. Preferably, then, the reference announcement will be played twice, once using a first voicing threshold point, and the second time using a second threshold voicing point.

Alternatively, a relative percent measure for neighboring AFP values may be used. This provides a safety margin, resulting in increased reliability in the case of there being variations in signal power when the sample announcements must later be recognized.

The number of variables stored for each announcement will differ, being dependent upon the duration of the utterance whose parameters are being stored.

Figure 5:
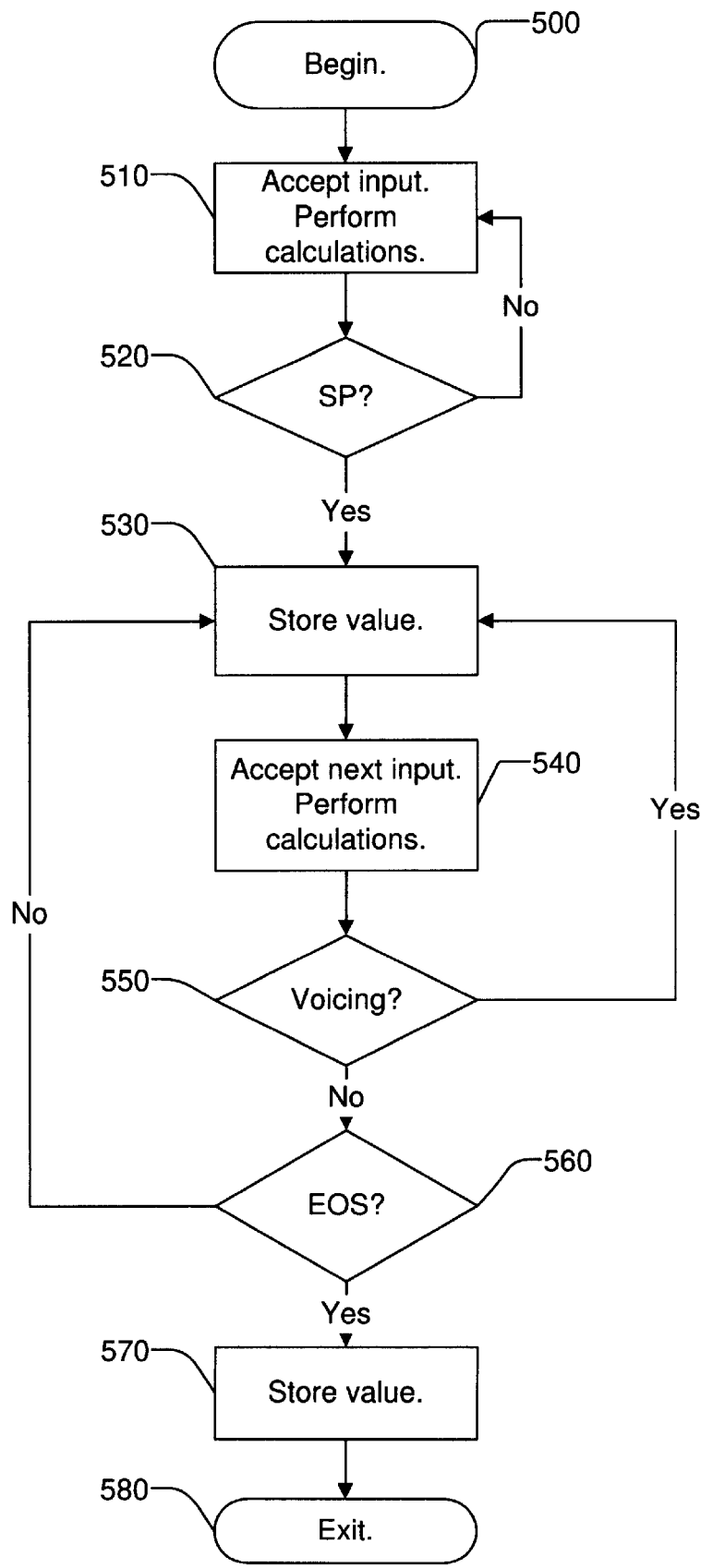
FIG. 5 is a flowchart of the general method of parameter determination and storage in accordance with the invention.

The flow chart of FIG. 5 shows, generally, the process for obtaining a string of parameters in memory corresponding to a given key word, key phrase, or announcement. In S500 the training session begins. Input is accepted in S510 and calculations are performed to obtain its parametric value. In S520 a determination is made as to whether the threshold has been passed indicating the start of speech. If not, additional input is accepted in S510 and S520 repeated until SP has occurred. Once SP is reached, the value is stored in S530, and the process of accumulating data begins. In S540 the next input is accepted and parameterized. A determination is made at to whether this input constitutes voicing or silence in S550. If voicing, then the value is stored in a return to S530. If silence, a determination is made as to whether this is an SGL or EOS in S560. If not EOS then it is SGL and the information is stored in S530 again. If EOS then the information is stored in S570 and the process exits in S580.

Sample announcements that are made up of very short utterances may not be recognizable with respect to reference announcements in this simple model. This is because the few parameters stored may not contain sufficient detail to differentiate one parameter set from another. Hence, there is a very real concern that false recognition will result.

If this presents a problem, then additional information should be garnered from the reference announcement in order to provide the level of detail needed. A simple way of doing this is to shorten the duration of each power frame length in order to increase the number of AFP values available for comparison.

Typically, then the sequence of symbols within the sequence of parameters will appear as: <SP><AFP> . . . <AFP><SGL>[<AFP> . . . <AFP><SGL>]<EOS>, where the portion in brackets repeats multiple times and where there are multiple instances of <AFP> indicated by the ellipses.

Figure 3:
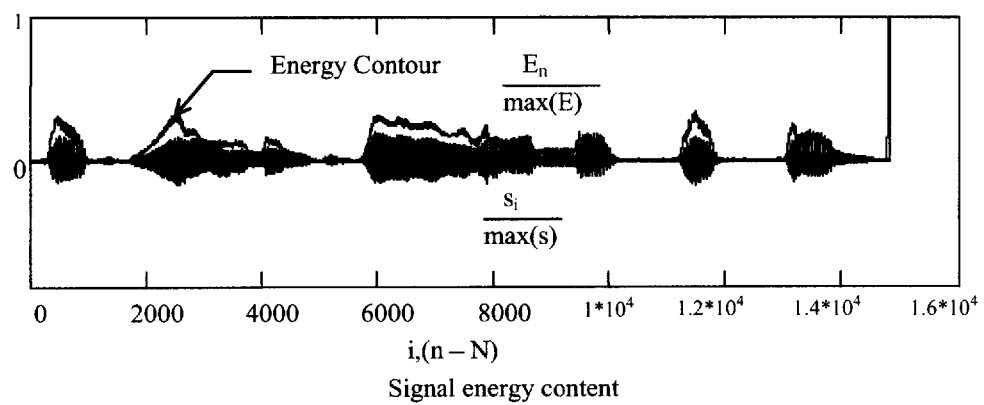
FIG. 3 is a graph of the signal energy content of the utterance of FIG. 2.

For the announcement exemplified in FIGS. 2–4, namely the key phrase "If you are an employee on this system," the signal produced by this announcement is transformed in accordance with this invention to 23 parameter sets, whose values are shown in Table II. Each parameter set consists of these three values: a symbol indicating the type of event (EOS, SGL, etc), the number of samples contributing to the average decibel value, of appropriate, and the average decibel value.

TABLE II

| Count (Samples) | Value (dB) | Symbol |
|---|---|---|
| 302 | 0.000000 | SP |
| 661 | 46.600548 | AFP |
| 343 | 0.000000 | SGL |
| 99 | 38.540813 | AFP |
| 344 | 0.000000 | SGL |
| 1000 | 45.876713 | AFP |
| 1000 | 45.574783 | AFP |
| 1000 | 43.008213 | AFP |
| 82 | 39.178421 | AFP |
| 301 | 0.000000 | SGL |
| 166 | 38.717537 | AFP |
| 429 | 0.000000 | SGL |
| 1000 | 47.800781 | AFP |
| 1000 | 47.291508 | AFP |
| 1000 | 45.453209 | AFP |
| 1000 | 43.384571 | AFP |
| 393 | 43.380829 | AFP |
| 1090 | 0.000000 | SGL |
| 651 | 46.262039 | AFP |
| 1177 | 0.000000 | SGL |
| 1000 | 44.939674 | AFP |
| 386 | 39.134693 | AFP |
| 365 | 0.000000 | SGL |

If different constants had been chosen, different parameter values would have been obtained for this key phrase. For this example, a voicing threshold value of 37 dB is used. Also, for simplicity, it is assumed that key phrases begin with leading silence and end in trailing silence. The user may ignore the count values of both these silence parameters.

Figure 6:
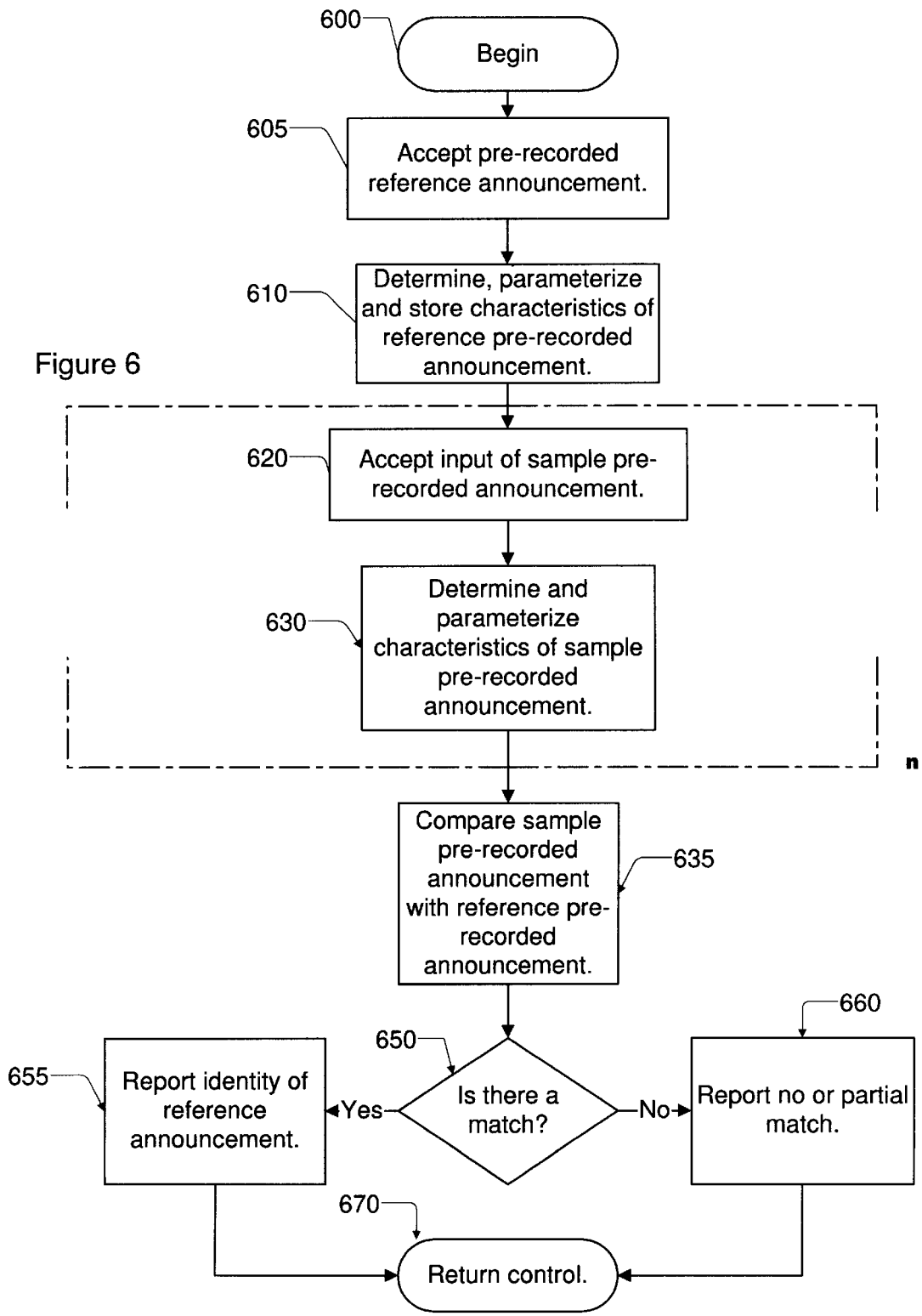
FIG. 6 is a flowchart of the general method of speech recognition in accordance with the invention.

FIG. 6 shows, generally, the method for determining whether there is a match between a pre-recorded sample announcement and a pre-recorded reference announcement on which the system had been trained earlier. In S600 control is given to the process which determines the existence of a match. In S605 a pre-recorded reference announcement is accepted. Next, in S610 the characteristics of the pre-recorded reference announcement are determined, parameterized and stored in memory. In the following step, S620, a sample pre-recorded announcement is accepted as input. Determination of the characteristics of the sample pre-recorded input and parameterization of those characteristic occurs in S630.

Next, at S635, the sample pre-recorded announcement is compared with the pre-recorded reference announcement. Preferably, S630 and S635 are performed iteratively in real time, with each parameter being determined upon input and then immediately tested against the stored reference parameters as is shown in the state machine of FIG. 7.

Alternatively, a cross-correlation formula is applied to the key phrase signature (parameter collection for the reference announcements) with respect to the calculated parameters of the signal from the sample announcement.

In either case, a determination is made by comparison of the parameters of the pre-recorded reference announcement with those of the pre-recorded sample announcement, as to whether or not a match exists (S650). If a match is found, then the process reports the identity of the reference announcement back to the calling program (S655). If no match is found or, only a partial match is found (where the process concerns itself with partial matches), then the process reports this fact back to the calling program (S660). If the process reports partial matches, the process may calculate a "score" for the partial match, based on factors such as the number of parameters matched exactly, the degree of mismatch for mismatched parameters, etc. The partial match score is then saved and returned to the user as a form of confidence.

In any case control is then returned to the calling program in S670.

Figure 7:
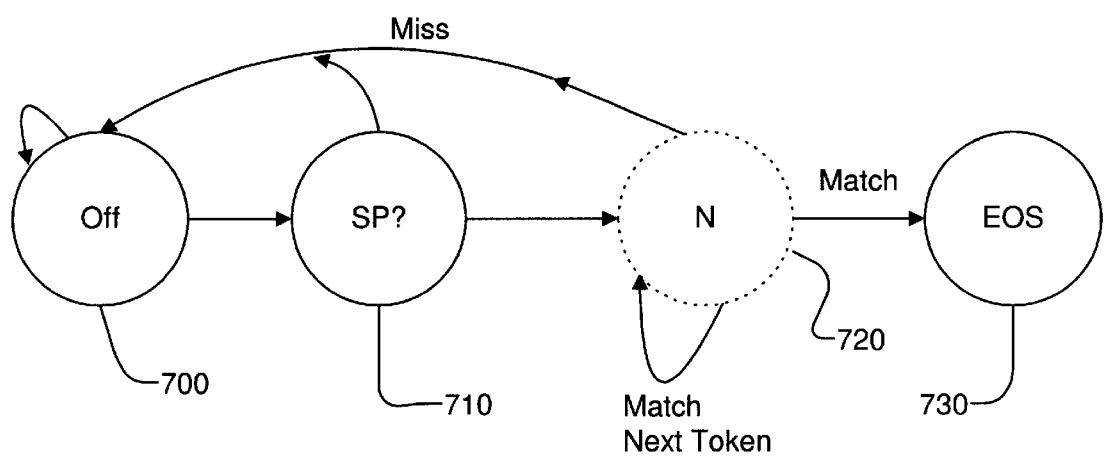
FIG. 7 is a state diagram for recognizing announcements.

FIG. 7 represents the state machine for recognizing, in real time, that a sample pre-recorded announcement corresponds to a reference pre-recorded announcement. Recognizing an announcement in an input sample signal involves applying the same transformation that was used on the identical announcement when input as the reference signal. Thus, an instantaneous determination is made of what the current parameter is.

Figure 8:
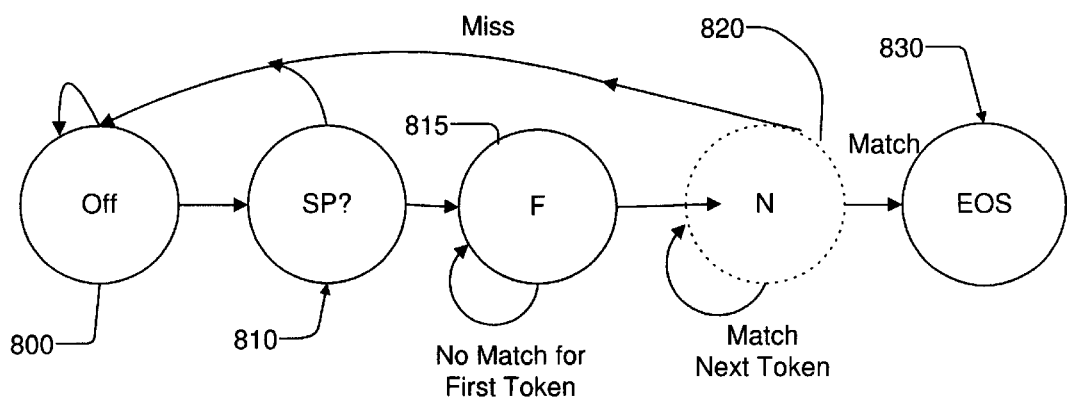
FIG. 8 is a state diagram for recognizing key words or phrases.

From the OFF state of 700, the system remains OFF until a signal is accepted. Upon acceptance of a signal, the system transitions to state 710 where it determines whether a start of speech (SP) has occurred. If not, the system returns to the OFF state 700. Once an SP has been recognized, the START state 720 is reached. In state 720 each parameter is viewed as a token. At each transition (from speech to silence or silence to speech), the newly calculated parameter is compared against an expected, stored parameter. If a match is made and the symbol associated with the parameter is not EOS, then the state machine advances a step and continues to the next parameter. This continues until the EOS is reached in state 730 or a pair of parameters do not match up. Reaching the EOS for a set of parameters corresponding to a pre-recorded reference announcement indicates a match to that reference announcement exists. If, at any point, a no-match or only partial match situation occurs, then the search state machine may be reset. Optionally, partial match scores may be saved and returned to the user in the form of a confidence level.

Where the matches are being only made for key words or phrases rather than entire announcements, the state machine of FIG. 8 is applicable. The system remains in an OFF state 800 until a signal is accepted. Upon acceptance of a signal, the system transitions to state 810 and determines whether a start of speech (SP) has occurred. If not, the system returns to the OFF state 800. Once an SP has been recognized, each parameter is viewed as a token. At each transition (from speech to silence or silence to speech), the newly calculated parameter is compared against an expected, stored parameter in state 815 to see whether the start of a key phrase has occurred (as compared with that speech which precedes a key phrase). Once a match is made, the machine advances to the next token in state 820. At this point, if a match is found for the next parameter of the key phrase and the symbol of that parameter is not EOS, then the state machine advances a step and investigates the next parameter. This continues until the EOS symbol occurs in state 830 or a pair of parameters do not match up. Recognizing the EOS symbol for a set of parameters corresponding to a pre-recorded reference announcement indicates a match to that reference announcement. If, at any point, a no-match or only partial match situation occurs, then the search state machine may be reset. Similarly, it may be reset if it remains in state 815 for more than a pre-determined number of tokens. Optionally, partial match scores may be saved and returned to the user in the form of a confidence level.

In many instances there will be more than one reference pre-recorded announcement against which a sample pre-recorded announcement is to be tested. In this case, a number of state machines may be launched simultaneously. Whichever state machine gets to the EOS symbol first fires a positive recognition announcement and all other state machines may be reset at that time. Scores for all state machines would be available to the application.

In the alternative to simultaneous state machine launching, launching may be sequential from a list by manipulation of pointers. As another alternative, a single state machine may be used where parameters are stored in a tree structure. In this case the state machine will change states as each parameter is recognized until such time as it reaches a state representing a parameter associated with only one announcement.

When more than one state machine is being simultaneously run, pattern comparison for all parameters occurs once every state change. The next parameter from each set of pre-recorded reference parameters is compared against the current sample parameter derived from the input speech.

The method of this invention is capable of being further fine-tuned depending upon the results of the initial training session with a complete set of pre-recorded announcements. Where the set of pre-recorded reference announcements is a small one, or the pre-recorded reference announcements differ greatly from one another as to parameter sets, adjustments can be made to increase the economies of storage and calculation. Thus, for example, integer values can be used for the parameters as part of normalization, and/or the number of samples in an AFP can be increased, leading to fewer AFPs being calculated and stored. The integer values are obtained by rounding or using fixed point arithmetic.

Alternatively, it may be that the set of collected parameters is not sufficient to allow correct recognition of a sample pre-recorded announcement as against the reference pre-recorded announcements. This may lead to an unknown sample announcement being accepted as a match to a pre-recorded reference announcement or to a pre-recorded sample announcement being matched with the incorrect pre-recorded reference announcement. If this occurs, then further details of the voicing portion are examined to determine what needs to be done to ensure the uniqueness of the signature. As one possibility, one or more voicing segments can be divided into equal length, or fixed length frames, with the average power of each segment stored as a parameter. In the alternative or, if necessary, additionally, a relative value system can be employed having a segment by segment normalization with respect to a fixed value.

The method of this invention provides performance characteristics superior to that of prior-art methodology for speech recognition. Some of these characteristics include:

Mathematics: In many instance, most of the calculations can be based on integer values, which minimizes storage, simplifies format and provides simplicity of mathematical operations. A typical energy calculation is a simplified summation with sign elimination. For every 32 additions, typically one logarithm needs to be determined for performance of power calculations. The logarithm value is usually obtained from a look-up table. A division operation is performed once every 1000 samples for averaging. Mathematical evaluation need only take place in response to the state machine transition, which is data driven. Long periods of silence, therefore, present the lightest load to the recognition engine.

Memory: The system has very low memory requirements for the parameters derived from key words. A one second long key word is represented by approximately 20 parameters. Efficient internal buffer space is utilized. Approximately 256 samples are buffered.

Confidence Scores: Confidences score which may be calculated include partial match, energy variance measure and duration variance measure. A partial match is calculated as:

Partial match=(No. of matching parameters/Total no. of parameters)*100%

For energy variance measure, an allowance of 5% variation in signal energy is acceptable to serve as compensation for possible signal quality changes. The energy variance measure is calculated as:

EVM=(|Signal parameter−key word parameter|/key word parameter)*100%

The duration variance measure is an allowance parameter to accommodate for variation in the duration of the count.

Other features: The parameters can be scaled by adjusting them for the frame size and filter size.

Training is a one step procedure. Only one pass is required to generate the reference pattern for a key word. This compares favorably with statistical models which require three or more passes.

The system also demonstrates language independence. No speech-specific knowledge is necessary.

Test Results

Initial tests correctly reported the location of a phrase in a long file containing multiple voices with 100% confidence. The key word voice segment was extracted from the same file to build the parameters. The tests were run at 38, 39 and 40 dB to search for the key word in an approximately two minute long sound file. The time duration of the recorded key word was one second. No false recognition results were reported.

Although exemplary embodiments of the present invention have been shown and described, it will be apparent to those having ordinary skill in the art that a number of changes, modifications, or alterations to the invention as described herein may be made, none of which depart from the spirit of the present invention. All such changes, modifications and alterations should therefore be seen as within the scope of the present invention.

It is claimed:

1. A method of recognizing a specific pre-recorded announcement using silence gaps in an end user's computer, the method comprising the steps of:

in a learning phase using the computer to do the following steps:
  (a) accepting as input for training a signal representing a reference pre-recorded announcement having at least one silence period to be received;
  (b) determining characteristics of a starting point (SP) for a transition from silence to speech in the reference pre-recorded announcement;
  (c) determining characteristics of a first voicing segment of the reference pre-recorded announcement;
  (d) determining a silence gap length (SGL) for a period of silence following the first voicing segment of the reference pre-recorded announcement;
  (e) determining characteristics of a second voicing segment of the reference pre-recorded announcement;
  (f) characterizing an end of speech (EOS) of the reference pre-recorded announcement;
  (g) storing the characteristics of the SP for the transition from silence to speech in the reference pre-recorded announcement;
  (h) storing the characteristics of the first voicing segment of the reference pre-recorded announcement;
  (i) storing the SGL for the period of silence following the first voicing segment of the reference pre-recorded announcement;
  (j) storing the characteristics of the second voicing segment of the reference pre-recorded announcement;
  (k) storing the characteristics of the FOS of the reference pre-recorded announcement;

in a recognition phase using the computer to do the following steps:
  (a) accepting as input from the second device for recognition a signal representing a sample prerecorded announcement;
  (b) recognizing the SP for the transition from silence to speech in the sample pre-recorded announcement;
  (c) determining characteristics of a first voicing segment of the sample pre-recorded announcement;
  (d) comparing the characteristics of the first voicing segment of the sample pre-recorded announcement with the stored characteristics of the first voicing segment of the reference pre-recorded announcement;
  (e) testing if the characteristics of the first voicing segment of the sample pre-recorded announcement match the stored characteristics of the first voicing segment of the reference pre-recorded announcement, and if so then: comparing the characteristics of the SGL for the period of silence following the first voicing segment of the sample pre-recorded announcement with the stored characteristics of the SGL for the period of silence following first voicing segment of the reference pre-recorded announcement;
  (f) testing if the characteristics of the SGL for the period of silence following the first voicing segment of the sample prerecorded announcement match the stored characteristics of the SGL for the period of silence following first voicing segment of the reference pre-recorded announcement, and if so then comparing the characteristics of the second voicing segment of the sample pre-recorded announcement from with the stored characteristics of the second voicing segment of the reference pre-recorded announcement;
  (g) testing if the characteristics of the second voicing segment of the sample pre-recorded announcement match the stored characteristics of the second voicing segment of the reference pre-recorded announcement, and if so then recognizing the EOS of the sample announcement; and
  (h) recognizing a match between the sample pre-recorded announcement and the reference pre-recorded announcement.

2. The method of claim 1 comprising the additional step of determining a level of confidence when there is an incomplete match between the reference pre-recorded announcement and the sample pre-recorded announcement.

3. The method of claim 1 comprising the additional steps of:

normalizing the signal representing the reference pre-recorded announcement; and normalizing the signal representing the sample pre-recorded announcement.

4. The method of claim 1 where the step of recognizing a match between the sample pre-recorded announcement and the reference pre-recorded announcement comprises the steps of:

recognizing transitions between voicing segments and silence and between silence and voicing segments;

at each transition evaluating a calculated signal derived from the sample pre-recorded announcement from the second device with an expected, stored signal derived from the reference pre-recorded announcement;

advancing a state machine if a match between the calculated signal derived from the sample pre-recorded announcement with an expected, stored signal derived from the reference pre-recorded announcement is obtained; and resetting the state machine if a match between the calculated signal derived from the sample pre-recorded announcement with an expected, stored signal derived from the reference pre-recorded announcement is not obtained.

5. The method of claim 4 further comprising the step of the first device determining that there is a match between the sample pre-recorded announcement and the reference pre-recorded announcement when the EOS of the sample pre-recorded announcement matches the EOS of the reference pre-recorded announcement.

6. The method of claim 4 wherein the computer obtains characteristics of a number of different pre-recorded reference announcements and stores the obtained characteristics in memory, and the computer launching state machines for each of the pre-recorded reference announcements upon initiation of the acceptance of input from a pre-recorded sample announcement.

7. The method of claim 1 where the step of recognizing a match between the sample pre-recorded announcement and the reference pre-recorded announcement is accomplished by cross correlation.

8. The method of claim 1 further comprising the steps of:
   determining in at least one test case if proper recognition of the sample pre-recorded announcement is made;
   testing if proper recognition of the sample announcement is not made and if so then:
   extracting further details of the voicing segments to uniquely identify the sample pre-recorded announcement.

9. The method of claim 8 wherein extracting further details of the voicing segments consists of subdividing each voicing segment into equal length frames.

10. The method of claim 8 wherein extracting further details of the voicing segments consists of subdividing each voicing segment into fixed length frames.

11. The method of claim 1 wherein each voicing segment comprises at least one power frame length, each power frame length having an average frame power (AFP) associated therewith.

12. A method of recognizing a specific phrase generated within a pre-recorded announcement using silence gaps in an end user's computer comprising the steps of:
   in a learning phase using the computer to do the following steps:
     (a) accepting as input a reference phrase having at least one silence period forming a portion of a pre-recorded announcement to be received;
     (b) determining a point where speech representing a beginning of the reference phrase occurs;
     (c) calculating mean energy between two points for voicing portions of speech in the reference phrase;
     (d) calculating a silence gap length within the reference phrase;
     (e) determining an end of the reference phrase;
     (f) storing as parameters for the reference phrase the point where speech representing a beginning of the reference phrase occurs, the mean energy between two points for voicing portions of speech, the silence gap length, and the end of the reference phrase;
   in a recognition phase using the computer to do the following steps:
     (a) accepting as input a sample phrase having silence periods forming a portion of a sample pre-recorded announcement;
     (b) determining a point where speech representing a beginning of the sample phrase occurs;
     (c) calculating mean energy between two points for voicing portions of speech in the sample phrase;
     (d) calculating a silence gap length within the sample phrase;
     (e) determining an end of the sample phrase; and
     (f) comparing the stored parameter values for the reference phrase with the point where speech representing a beginning of the sample phrase occurs, the mean energy between two points for voicing portions of speech for the sample phrase, the silence gap length in the sample phrase, and the end of the sample phrase.

13. The method of claim 12 comprising the additional step of determining a level of confidence when there is an incomplete match between the sample phrase and the reference phrase.

14. The method of claim 12 comprising the additional steps of:
   normalizing the signal representing the reference phrase; and
   normalizing the signal representing the sample phrase.

15. The method of claim 12 further comprising the steps of:
   determining in at least one test case if proper recognition of the sample phrase is made;
   testing if proper recognition of the sample phrase is not made and if so then:
   extracting further details of the voicing segments to uniquely identify the sample phrase.

16. The method of claim 15 wherein extracting further details of the voicing segments consists of subdividing each voicing segment into equal length frames.

17. The method of claim 15 wherein extracting further details of the voicing segments consists of subdividing each voicing segment into fixed length frames.

18. A method of a first device responding in an appropriate pre-determined fashion to a specific pre-recorded announcement from a second device using silence gaps in an end user's computer, the method comprising the steps of:
   in a learning phase using the computer to do the following steps:
     (a) accepting as input a reference pre-recorded announcement having at least one silence period;
     (b) obtaining time domain characteristics of voicing segments of the reference pre-recorded announcement;
     (c) storing in memory the obtained characteristics of voicing segments of the reference pre-recorded announcement obtained;
     (d) obtaining time domain characteristics of silence segments of the reference pre-recorded announcement;
     (e) storing in memory the obtained characteristics of silence segments of the reference pre-recorded announcement;
   in a recognition phase using the computer to do the following steps:
     (a) accepting as input a sample pre-recorded announcement;
     (b) obtaining time domain characteristics of voicing segments of the sample pre-recorded announcement;
     (c) comparing the time domain characteristics of the voicing segments of the sample pre-recorded announcement with the time domain characteristics of voicing segments of the reference pre-recorded announcement;
     (d) obtaining time domain characteristics of silence segments of the sample pre-recorded announcement;
     (e) comparing the time domain characteristics of the silence segments of the sample pre-recorded announcement with the time domain characteristics of silence segments of the reference prerecorded announcement;
     (f) determining from the comparisons if the sample pre-recorded announcement is a match with the reference pre-recorded announcement; and
     (g) testing if the sample pre-recorded announcement matches the reference pre-recorded announcement and if so then responding in the predetermined fashion.

19. The method of claim 18 where the step of recognizing a match between the sample pre-recorded announcement and the reference pre-recorded announcement comprises the steps of:
   recognizing transitions between voicing segments and silence and between silence and voicing segments;
   at each transition evaluating a calculated signal derived from the sample pre-recorded announcement with an expected, stored signal derived from the reference pre-recorded announcement;

advancing a state machine if a match between the calculated signal derived from the sample pre-recorded announcement and an expected, stored signal derived from the reference pre-recorded announcement is obtained; and resetting the state machine if a match between the calculated signal derived from the sample pre-recorded announcement with an expected, stored signal derived from the reference pre-recorded announcement is not obtained.

20. The method of claim 18 further comprising the step of determining that there is a match between the sample pre-recorded announcement and the reference pre-recorded announcement when the EOS of the sample pre-recorded announcement matches the EOS of the reference pre-recorded announcement.

21. The method of claim 20 wherein characteristics of a number of different pre-recorded reference announcements are all obtained and stored in memory and state machines for each of the pre-recorded reference announcements are all launched upon initiation of the acceptance of input from a pre-recorded announcement.

22. The method of claim 18 where the step of recognizing a match between the sample pre-recorded announcement and the reference pre-recorded announcement is accomplished by cross correlation.

23. The method of claim 18 comprising the additional step of determining a level of confidence when there is an incomplete match between the sample pre-recorded announcement and the reference pre-recorded announcement.

24. The method of claim 18 comprising the additional steps of:

normalizing the signal representing the reference pre-recorded announcement; and normalizing the signal representing the sample pre-recorded announcement.

25. The method of claim 18 further comprising the steps of:

determining that excess detail is being used to discriminate between different pre-recorded announcements; and adjusting calculated parameters so as to decrease detail levels and thus usage of storage and calculation resources.

26. The method of claim 25 wherein various characteristics are stored as parameters and usage of storage and calculation resources is decreased by normalizing the parameters.

27. The method of claim 25 wherein usage of storage and calculation resources is decreased by increasing the number of samples in an average power value for a voicing segment of speech calculated for each power frame length segment of the signal so that fewer average frame power values (AFPs) are calculated and stored.

28. A method comparing a sample pre-recorded voice announcement having at least one silence period with a reference pre-recorded voice announcement having at least one silence period in an end user's computer, the method comprising the steps of;

in a learning phase using the computer to do the following steps:

(1) determining a key phrase within the reference pre-recorded verbal announcement;

(2) accepting as input for training a signal representative of the key phrase within the reference pre-recorded announcement;

(3) determining characteristics of a starting point (SP) for a transition from silence to speech representing initiation of the key phrase in the reference pre-recorded announcement;

(4) determining characteristics of a first voicing segment of the key phrase of the reference pre-recorded announcement;

(5) determining a first silence gap length (SGL) for a period of silence following the first voicing segment of the key phrase of the reference pre-recorded announcement;

(6) determining characteristics of a next voicing segment of the key phrase of the reference pre-recorded announcement;

(7) repeating steps 5 and 6 of the learning phase until an end of the key phrase is noted;

(8) characterizing an end of speech (EOS) of the key phrase of the reference pre-recorded announcement;

(9) storing the characteristics of the SP for the transition from silence to speech in the key phrase of the reference pre-recorded announcement;

(10) storing the characteristics of the first voicing segment of the key phrase of the reference pre-recorded announcement;

(11) storing the SGL for the period of silence following the first voicing segment of the key phrase of the reference pre-recorded announcement;

(12) storing the characteristics of all succeeding voicing segments and SGLs of the key phrase of the reference pre-recorded announcement;

(13) storing the characteristics of the EOS of the key phrase of the reference pre-recorded announcement;

in a recognition phase using the computer to do the following steps:

(1) accepting as input for recognition a signal representing a sample pre-recorded announcement;

(2) recognizing the SP for the transition from silence to speech in the sample pre-recorded announcement;

(3) determining characteristics of a first voicing segment of the sample pre-recorded announcement;

(4) comparing the characteristics of the first voicing segment of the sample pre-recorded announcement with the stored characteristics of the first voicing segment of the key phrase of the reference pre-recorded announcement;

(5) testing if the characteristics of the first voicing segment of the sample pre-recorded announcement do not match the stored characteristics of the first voicing segment of the key phrase of the reference pre-recorded announcement, and if so then:

(6) repeating steps 2 through 5 of the recognition phase designating successive voicing segments as the first voicing segment of the sample pre-recorded announcement until the characteristics of the first voicing segment of the sample pre-recorded announcement matches the stored characteristics of the first voicing segment of the key phrase of the reference pre-recorded announcement indicating that the key phrase of the sample pre-recorded announcement has been reached;

(6) comparing the characteristics of the SGL for the period of silence following the first voicing segment of the key phrase of the sample pre-recorded announcement with the stored characteristics of the SGL for the period of silence following the first voicing segment of the key phrase of the reference pre-recorded announcement;

(7) testing if the characteristics of the SGL for the period of silence following the first voicing segment of the sample pre-recorded announcement match the stored characteristics of the SGL for the period of silence following first voicing segment of the reference pre-recorded announcement, and of so then;

(8) for all successive voicing segments and SGLs of the key phrase of the sample pre-recorded announcement, comparing the characteristics of each voicing segment and SGL of the sample pre-recorded announcement with respective stored characteristics of voicing segments and SGLs of the key phrase of the reference pre-recorded announcement and if characteristics of each voicing segment and SGL of the sample pre-recorded announcement matches the respective stored characteristics of voicing segments and SGLs of the key phrase of the reference pre-recorded announcement; then (9) recognizing the EOS of the key phrase of the sample pre-recorded announcement; and

(10) recognizing a match between the sample pre-recorded announcement and the reference pre-recorded announcement.

29. The method of claim 28 wherein steps 1 through 8 of the learning phase are performed at least twice, each time using a different voicing threshold point.

30. The method of claim 28 wherein voicing segments are broken down into power frame length segments, each having an average frame powers (AFP) and relative percent measures are used for neighboring AFP values.

31. A computer device located at an end user location, the computer device for responding in an appropriate pre-determined fashion to a pre-recorded sample announcement, the computer device comprising:

at the end user location in said computer device:
a processor;
a memory coupled to the processor for storing a program and data therein;
a data input device coupled to the processor;
an audio input subsystem coupled to the processor for accepting input speech signals; and
a stored program resident in the memory, the program for performing the steps of:
accepting as input a pre-recorded reference announcement;
obtaining time domain characteristics of voicing segments of the reference announcement;
storing in memory the obtained time domain characteristics of voicing segments of the reference announcement;
obtaining time domain characteristics of silence segments of the reference announcement;
storing in memory the obtained time domain characteristics of silence segments of the reference announcement;
accepting as input the pre-recorded sample announcement;
obtaining time domain characteristics of voicing segments of the sample announcement;
comparing the time domain characteristics of the voicing segments of the sample announcement from the pre-recorded announcement playing device with the time domain characteristics of voicing segments of the reference announcement;
obtaining time domain characteristics of silence segments of the sample announcement;
comparing the time domain characteristics of the silence segments of the sample announcement with the characteristics of silence segments of the reference announcement;
determining from the comparisons if the sample announcement is a match with the reference announcement; and
if the sample announcement matches the reference announcement then responding in a pre-determined fashion.

32. A computer device located at an end user location the computer device for recognizing a sample phrase generated within a sample pre-recorded announcement, the computer device comprising:

at the end user location in said computer device:
a processor;
a memory coupled to the processor for storing a program and data therein;
a data input device coupled to the processor;
an audio input subsystem coupled to the processor for accepting input speech signals; and
a stored program resident in the memory, the program for performing the steps of:
accepting as input a reference phrase forming a portion of a pre-recorded reference announcement;
determining a point where speech representing a beginning of the reference phrase occurs;
calculating mean energy between two points for voicing portions of speech in the reference phrase;
calculating a silence gap length within the reference phrase;
determining an end of the reference phrase;
storing as parameters for the reference phrase the point where speech representing a beginning of the reference phrase occurs, the mean energy between two points for voicing portions of speech, the silence gap length, and the end of the reference phrase;
accepting as input the sample phrase forming a portion of the sample pre-recorded announcement;
determining a point where speech representing a beginning of the sample phrase occurs;
calculating mean energy between two points for voicing portions of speech in the sample phrase;
calculating a silence gap length within the sample phrase;
determining an end of the sample phrase; and
comparing the stored parameter values for the reference phrase with the point where speech representing a beginning of the sample phrase occurs, the mean energy between two points for voicing portions of speech for the sample phrase, the silence gap length in the sample phrase, and the end of the sample phrase.

33. The computer system of claim 32 wherein the stored program determines a level of confidence when there is an incomplete match between the phrase in the sample pre-recorded announcement and the phrase in the reference pre-recorded announcement.

34. A program storage device readable by an end user's machine, tangibly embodying a program of instructions executable by the machine to perform method steps for responding in an appropriate pre-determined fashion to a pre-recorded sample announcement, the method steps comprising:

in a learning subroutine using the end user's machine to do the following steps:
: accepting as input a pre-recorded reference announcement;
: obtaining time domain characteristics of voicing segments of the reference announcement;
: storing in memory the obtained time domain characteristics of voicing segments of the reference announcement;
: obtaining time domain characteristics of silence segments of the reference announcement;
: storing in memory the obtained time domain characteristics of silence segments of the reference announcement;

in a recognition subroutine using the end user's machine to do the following steps:
: accepting as input the pre-recorded sample announcement in a time domain;
: obtaining time domain characteristics of voicing segments of the sample announcement from the pre-recorded announcement playing device;
: comparing the time domain characteristics of the voicing segments of the sample announcement with the time domain characteristics of voicing segments of the reference announcement;
: obtaining time domain characteristics of silence segments of the sample announcement;
: comparing the time domain characteristics of the silence segments of the sample announcement with the time domain characteristics of silence segments of the reference announcement;
: determining from the comparisons if the sample announcement is a match with the reference announcement; and
: if the sample announcement matches the reference announcement then responding in a pre-determined fashion.

35. A computer program product comprising a computer usable medium having computer readable program code means embodied therein comprising computer readable program code means for causing an end user's computer to recognize a sample phrase generated within a sample pre-recorded announcement the recognition being performed by steps comprising:

in a learning subroutine using the end user's computer to do the following steps:
: accepting as input a reference phrase forming a portion of a pre-recorded reference announcement;
: determining a point where speech representing a beginning of the reference phrase occurs;
: calculating mean energy between two points for voicing portions of speech in the reference phrase;
: calculating a silence gap length within the reference phrase;
: determining an end of the reference phrase;
: storing as parameters for the reference phrase the point where speech representing a beginning of the reference phrase occurs, the mean energy between two points for voicing portions of speech, the silence gap length, and the end of the reference phrase;

in a recognition subroutine using the end user's computer to do the following steps:
: accepting as input the sample phrase forming a portion of the pre-recorded announcement;
: determining a point where speech representing a beginning of the sample phrase occurs;
: calculating mean energy between two points for voicing portions of speech in the sample phrase;
: calculating a silence gap length within the sample phrase;
: determining an end of the sample phrase; and
: comparing the stored parameter values for the reference phrase with the point where speech representing a beginning of the sample phrase occurs, the mean energy between two points for voicing portions of speech for the sample phrase, the silence gap length in the sample phrase, and the end of the sample phrase.

36. A method of training a computer to recognize a pre-recorded announcement from a pre-recorded announcement playing device comprising using the computer to do the following the steps of:
: accepting as input a phrase from the pre-recorded announcement playing device forming a portion of the pre-recorded announcement;
: determining a point where speech representing a beginning of the phrase from the pre-recorded announcement playing device occurs;
: calculating mean energy between two points for voicing portions of speech in the phrase from the pre-recorded announcement playing device;
: calculating a silence gap length within the phrase from the pre-recorded announcement playing device;
: determining an end of the phrase from the pre-recorded announcement playing device; and
: storing as parameters for the phrase from the pre-recorded announcement playing device the point where speech representing a beginning of the phrase occurs, the mean energy between two points for voicing portions of speech, the silence gap length, and the end of the phrase from the pre-recorded announcement playing device.

37. A method of comparing a sample pre-recorded announcement with a previously analyzed reference pre-recorded announcement wherein parameters representing a key phrase of the reference pre-recorded announcement have been stored using an end user's computer, comprising the steps of:
: accepting as input a sample phrase forming a portion of the sample pre-recorded announcement;
: determining a point where speech representing a beginning of the sample phrase;
: calculating mean energy between two points for voicing portions of speech in the sample phrase;
: calculating a silence gap length within the sample phrase;
: determining an end of the sample phrase; and
: comparing the stored parameter values for the reference phrase with the point where speech representing a beginning of the sample phrase occurs, the mean energy between two points for voicing portions of speech for the sample phrase, the silence gap length in the sample phrase, and the end of the sample phrase.

* * * * *